(12) United States Patent
Bethmann et al.

(10) Patent No.: US 11,431,605 B2
(45) Date of Patent: Aug. 30, 2022

(54) COMMUNICATION SYSTEM TESTER AND RELATED METHODS

(71) Applicant: Schweitzer Engineering Laboratories, Inc., Pullman, WA (US)

(72) Inventors: Glenn C. Bethmann, Pullman, WA (US); Mauricio G. Silveira, Pullman, WA (US); Stephanie L. McDaid, Kennewick, WA (US); Andrew W. Rash, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 34 days.

(21) Appl. No.: 17/123,182

(22) Filed: Dec. 16, 2020

(65) Prior Publication Data

US 2022/0191123 A1 Jun. 16, 2022

(51) Int. Cl.
*H04L 43/50* (2022.01)
*H04L 43/0852* (2022.01)
*H04L 43/0817* (2022.01)
*H04L 43/0882* (2022.01)

(52) U.S. Cl.
CPC .......... *H04L 43/50* (2013.01); *H04L 43/0817* (2013.01); *H04L 43/0852* (2013.01); *H04L 43/0882* (2013.01)

(58) Field of Classification Search
CPC . H04L 43/50; H04L 43/0852; H04L 43/0882; H04L 43/0817
See application file for complete search history.

(56) References Cited

U.S. PATENT DOCUMENTS

| | | | |
|---|---|---|---|
| 6,747,957 B1 | 6/2004 | Pithawala | |
| 7,218,632 B1 | 5/2007 | Bechtolsheim | |
| 7,376,831 B2 | 5/2008 | Kollmyer | |
| 7,872,983 B2 | 1/2011 | Lai | |
| 8,553,544 B2 | 10/2013 | Lai | |
| 8,800,044 B2 | 8/2014 | Raad | |
| 9,237,129 B2 | 1/2016 | Ling | |
| 9,286,171 B2 | 3/2016 | Cardiba | |
| 9,660,895 B1 * | 5/2017 | Bennett | H04W 40/20 |
| 9,769,060 B2 * | 9/2017 | Dearien | H04L 41/122 |
| 9,866,483 B2 | 1/2018 | Smith | |
| 10,298,498 B2 | 5/2019 | Smith | |
| 2002/0172157 A1 | 11/2002 | Rhodes | |
| 2003/0112821 A1 | 6/2003 | Cleveland | |

(Continued)

*Primary Examiner* — Michael A Keller
*Assistant Examiner* — Jsing Forng Lin
(74) *Attorney, Agent, or Firm* — Jared L. Cherry (57) ABSTRACT

The present disclosure relates to systems and methods for testing communication systems. In one embodiment, a communication device tester may include a traffic disciplining subsystem to generate a first stream of data packets satisfying a metric and may communicate the first stream of data packets to a test device in a first test scenario. A delay subsystem may generate a variable delay in a second stream of data packets and communicate the second stream of data packets to the test device in a second test scenario. A data corruption subsystem may corrupt a third stream of data packets and communicate the third stream of data packets to the test device in a third test scenario. A test subsystem may determine whether the test device satisfies at least one criterion of each of the first test scenario, the second test scenario, and the third test scenario.

20 Claims, 6 Drawing Sheets

(56) References Cited

U.S. PATENT DOCUMENTS

| | | |
|---|---|---|
| 2003/0125924 A1 | 7/2003 | Lines |
| 2003/0188159 A1 | 10/2003 | Josset |
| 2004/0181573 A1* | 9/2004 | Cao ................. H04L 41/145 |
| | | 709/200 |
| 2005/0078672 A1 | 4/2005 | Caliskan |
| 2007/0074280 A1* | 3/2007 | Callaghan ............ H04L 63/029 |
| | | 726/12 |
| 2008/0005558 A1 | 1/2008 | Hadley |
| 2011/0087952 A1 | 4/2011 | Marin |
| 2013/0077477 A1 | 3/2013 | Daraiseh |
| 2013/0108259 A1 | 5/2013 | Srinivas |
| 2013/0212285 A1 | 8/2013 | Hoffmann |
| 2013/0294228 A1 | 11/2013 | Ahuja |
| 2014/0029451 A1 | 1/2014 | Nguyen |
| 2014/0160939 A1 | 6/2014 | Arad |
| 2014/0226467 A1 | 8/2014 | Park |
| 2014/0376406 A1 | 12/2014 | Kim |
| 2015/0195190 A1 | 7/2015 | Shah Heydari |
| 2015/0312658 A1 | 10/2015 | Winzer |
| 2016/0043996 A1 | 2/2016 | Syed Mohamed |
| 2016/0119299 A1 | 4/2016 | Amulothu |
| 2016/0142427 A1 | 5/2016 | de los Reyes |
| 2019/0199772 A1* | 6/2019 | Pennarun ................. H04L 65/80 |
| 2020/0374751 A1* | 11/2020 | Krishnaswamy .. H04B 17/3912 |
| 2021/0075697 A1* | 3/2021 | Dattagupta .......... H04L 41/0886 |

* cited by examiner

Figure 6

COMMUNICATION SYSTEM TESTER AND RELATED METHODS

TECHNICAL FIELD

This disclosure relates to systems and methods for testing communication systems. More specifically but not exclusively, the present disclosure relates to testing machine-to-machine communication systems used in industrial applications, such as electric power systems and software-defined networks (SDNs).

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Electric power systems are used to generate, transmit, and distribute electric power to loads, and serve as an important part of critical infrastructure. Electric power systems and equipment may be monitored and protected by a variety of types of equipment. Protection relays may analyze the parameters of an electric power system to implement protective functions. The primary protective relays may communicate with various other supervisory devices such as automation systems, monitoring systems, supervisory (SCADA) systems, and other intelligent electronic devices (IEDs). IEDs may collect data from various devices within an electric power system and monitor, control, automate, and/or protect such devices.

Engineering such systems is a difficult task that requires coordination of a variety of types of equipment, including electrical generation and distribution equipment (e.g., generators, transformers, transmission lines, etc.) and communication equipment that allows for the transmission of information used to monitor and protect the electric power system. Rigorous testing of such systems may help to ensure that the electric power system provides safe and reliable electric power. Such testing may occur when equipment is installed and throughout the life of the electric power system.

Testing of complex communications systems, such as those used in electric power systems, typically involves the use of complex test equipment. The complexity of the test systems results from the need to simulate complex conditions. For example, a network communicating data related to a transmission line that spans several kilometers has a measurable propagation delay associated with the propagation along the length of the transmission line. In some instances, testing such a system involves physically connecting several kilometers of cables to replicate the corresponding delay in the system under test. Moreover, testing equipment is highly specialized, thus commonly necessitating many test devices suited for specific tasks. Such equipment is expensive and requires considerable effort and expertise to utilize.

The inventors of the present disclosure have recognized that the systems and methods disclosed herein may allow for a more robust and economical testing solution. The systems and methods disclosed herein may allow for a wide variety of testing applications, thus reducing or eliminating the need for multiple highly specialized test systems. In various embodiments, systems and methods may be used to test the operation of protective equipment, such as IEDs.

As used herein, an IED may refer to any microprocessor-based device that monitors, controls, automates, and/or protects monitored equipment within a system. Such devices may include, for example, differential relays, distance relays, directional relays, feeder relays, overcurrent relays, voltage regulator controls, voltage relays, breaker failure relays, generator relays, motor relays, remote terminal units, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs. Further, IEDs may include sensors (e.g., voltage transformers, current transformers, contact sensors, status sensors, light sensors, tension sensors, etc.) that provide information about the electric power system. The testing systems disclosed herein may be used to test other types of communications systems. Such systems may be used in any type of industrial network, including networks used in applications beyond electric power systems. The present disclosure discusses electric power systems, but one of skill in the art will recognize that the teachings of the present disclosure may be readily utilized in connection with networks used in a variety of industries.

The embodiments of the disclosure will be best understood by reference to the drawings. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor do the steps need to be executed only once, unless otherwise specified.

In some cases, well-known features, structures, or operations are not shown or described in detail. Furthermore, the described features, structures, or operations may be combined in any suitable manner in one or more embodiments. It will also be readily understood that the components of the embodiments, as generally described and illustrated in the figures herein, could be arranged and designed in a wide variety of different configurations. For example, throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Several aspects of the embodiments disclosed herein may be implemented as software modules or components. As used herein, a software module or component may include any type of computer instruction or computer-executable code located within a memory device that is operable in conjunction with appropriate hardware to implement the programmed instructions. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory machine-readable medium having stored thereon instructions that may be used to program a computer or other electronic device to perform processes described herein. The non-transitory machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable media suitable for storing electronic instructions. In some embodiments, the computer or another electronic device may include a processing device such as a microprocessor, microcontroller, logic circuitry, or the like. The processing device may further include one or more special-purpose processing devices such as an application-specific interface circuit (ASIC), PAL, PLA, PLD, field-programmable gate array (FPGA), or any other customizable or programmable device.

Figure 1:
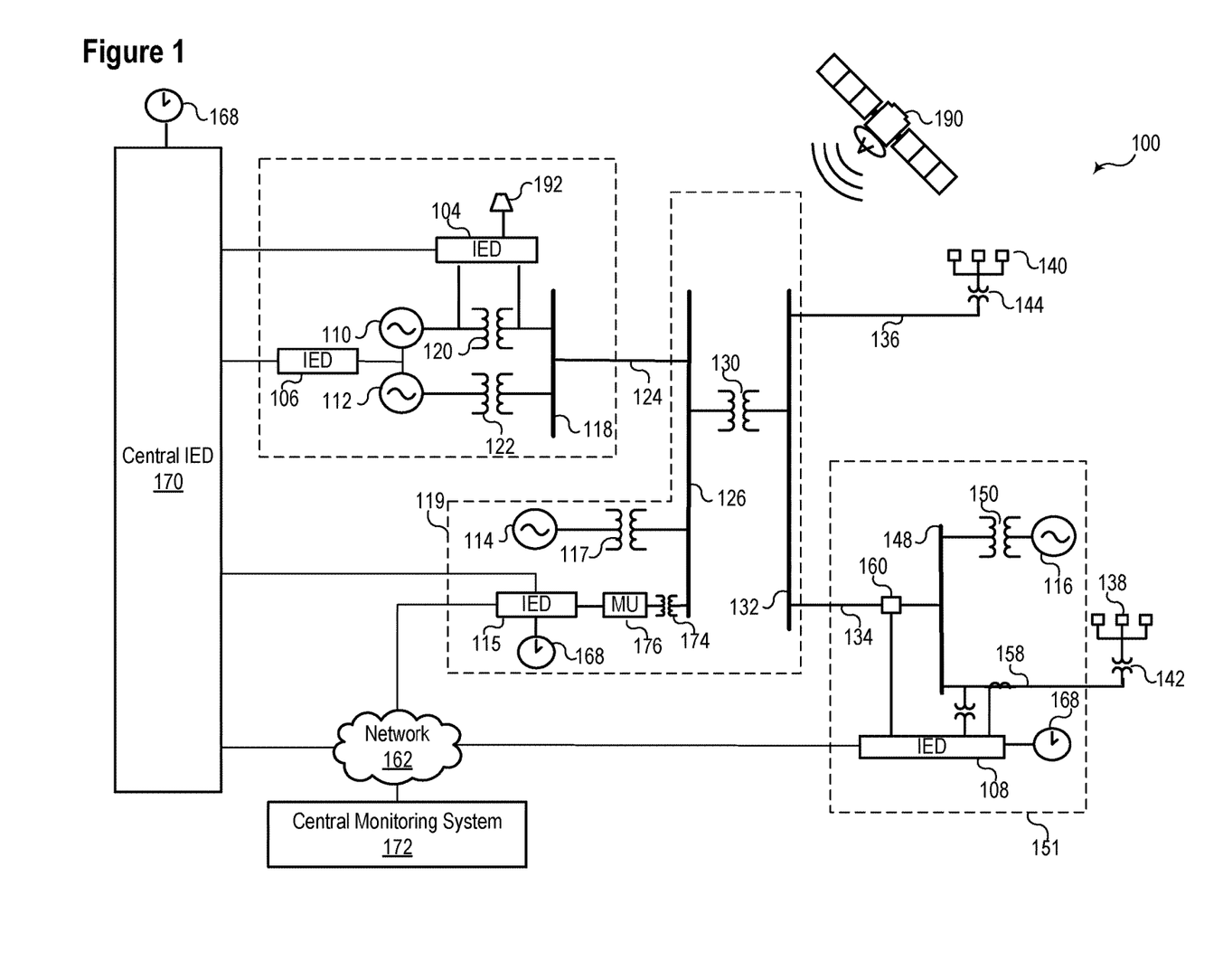
FIG. 1 illustrates a simplified one-line diagram of an electric power delivery system consistent with embodiments of the present disclosure.

FIG. 1 illustrates a simplified one-line diagram of an electric power delivery system 100 consistent with embodiments of the present disclosure. Electric power delivery system 100 may be configured to generate, transmit, and distribute electric energy to loads. Electric power delivery systems may include equipment such as electrical generators (e.g., generators 110, 112, 114, and 116), transformers (e.g., transformers 117, 120, 122, 130, 142, 144, 150, and 174), power transmission and delivery lines (e.g., lines 124, 134, 136, and 158), circuit breakers (e.g., breaker 160), busses (e.g., busses 118, 126, 132, and 148), loads (e.g., loads 140 and 138) and the like. A variety of other types of equipment may also be included in electric power delivery system 100, such as voltage regulators, capacitor banks, and the like.

Substation 119 may include a generator 114, which may be a distributed generator, and which may be connected to bus 126 through step-up transformer 117. Bus 126 may be connected to a distribution bus 132 via a step-down transformer 130. Various distribution lines 136 and 134 may be connected to distribution bus 132. Load 140 may be fed from distribution line 136. Further, step-down transformer 144 in communication with distribution bus 132 via distribution line 136 may be used to step down a voltage for consumption by load 140.

Distribution line 134 may lead to substation 151 and deliver electric power to bus 148. Bus 148 may also receive electric power from distributed generator 116 via transformer 150. Distribution line 158 may deliver electric power from bus 148 to load 138 and may include further step-down transformer 142. Circuit breaker 160 may be used to selectively connect bus 148 to distribution line 134. IED 108 may be used to monitor and/or control circuit breaker 160 as well as distribution line 158.

Electric power delivery system 100 may be monitored, controlled, automated, and/or protected using IEDs, such as IEDs 104, 106, 108, 115, and 170, and a central monitoring system 172. In general, IEDs in an electric power generation and transmission system may be used for protection, control, automation, and/or monitoring of equipment in the system. For example, IEDs may be used to monitor equipment of many types, including electric transmission lines, electric distribution lines, current transformers, busses, switches, circuit breakers, reclosers, transformers, autotransformers, tap changers, voltage regulators, capacitor banks, generators, motors, pumps, compressors, valves, and a variety of other types of monitored equipment.

Central monitoring system 172 may comprise one or more of a variety of types of systems. For example, central monitoring system 172 may include a supervisory control and data acquisition (SCADA) system and/or a wide area control and situational awareness (WACSA) system. A central IED 170 may be in communication with IEDs 104, 106, 108, and 115. IEDs 104, 106, 108, and 115 may be remote from the central IED 170 and may communicate over various media such as a direct communication from IED 106 or over a wide-area communications network 162. According to various embodiments, certain IEDs may be in direct communication with other IEDs (e.g., IED 104 is in direct communication with central IED 170) or may be in communication via a communication network 162 (e.g., IED 108 is in communication with central IED 170 via communication network 162).

In some embodiments, communication network 162 may comprise an SDN, and the systems and methods disclosed herein may be utilized to test communications sent through an SDN. SDN networking technologies offer a variety of advantages, such as deny-by-default security, latency guarantees, deterministic transport capabilities, redundancy, and fail-over planning, etc. An SDN allows a programmatic change control platform, which allows an entire communication network to be managed as a single asset, simplifies the understanding of the network, and enables continuous monitoring of a network. In an SDN, the systems that decide where the traffic is sent (i.e., the control plane) are separated from the systems that perform the forwarding of the traffic in the network (i.e., the data plane).

The control plane may be used to optimize the usage of network resources by creating specific data flows through the communication network. A data flow, as the term is used herein, refers to a set of parameters used to identify and to take action based on network packet contents and/or criteria. Data flows may permit dedicated paths based on a variety of criteria that offer significant control and precision to operators of the network. In contrast, in large traditional networks, trying to match a network-discovered path with an application-desired data path may be a challenging task involving changing configurations in many devices. To compound this problem, the management interfaces and feature sets used on many devices are not standardized. Further, network administrators often need to reconfigure the network to avoid loops, gain route convergence speed, and prioritize a certain class of applications.

Significant complexity in managing a traditional network in the context of an electric power transmission and distribution system arises from the fact that each network device (e.g., a switch or router) includes both control logic and data forwarding logic. For example, in a traditional network router, routing protocols such as Routing Information Protocol (RIP) or Open Shortest Path First (OSPF) constitute the control logic that determines how a packet should be forwarded. The paths determined by the routing protocol are encoded in routing tables, which are then used to forward packets. Similarly, in a Layer 2 device such as a network bridge (or network switch), configuration parameters and/or a Spanning Tree Algorithm (STA) constitute the control logic that determines the path of the packets. Thus, the control plane in a traditional network is distributed in the switching fabric (network devices), and as a consequence, changing the forwarding behavior of a network involves changing configurations of many (potentially all) network devices.

In an SDN, a controller embodies the control plane and determines how packets (or frames) should flow (or be forwarded) in the network. The controller communicates this information to the network devices, which constitute the data plane. The controller may set forwarding tables in network devices that establish how data is to be routed. This enables centralized configuration and management of a network. In addition to simplifying management of a network, an SDN architecture may also enable monitoring and troubleshooting features that may be beneficial for use in an electric power distribution system, including but not limited to: mirroring a data-selected flow rather than mirroring a whole port; alarming on bandwidth when it gets close to saturation; providing metrics (e.g., counters and meters for quality of service, packet counts, errors, drops, or overruns, etc.) for a specified flow; and permitting the monitoring of specified applications rather than monitoring based on virtual local area networks (VLAN) or media access control (MAC) addresses.

A common time signal 168 may be used to time-align measurements for comparison and/or synchronize action across system 100. Utilizing a common or universal time source may allow for the generation of time-synchronized data, such as synchrophasors. In various embodiments, the common time source may comprise a time signal from a GNSS system 190. IED 104 may include a receiver 192 configured to receive the time signal 168 from the GNSS system 190. In various embodiments, IED 106 may be configured to distribute the time signal 168 to other components in system 100, such as IEDs 104, 108, 115, and 170.

A voltage transformer 174 may be in communication with a merging unit (MU) 176. MU 176 may provide information from voltage transformer 174 to IED 115 in a format useable by IED 115. MU 176 may be placed near to voltage transformer 174 and may digitize discrete input/output (I/O) signals and analog data, such as voltage measurements. These data may then be streamed to IED 115. In various embodiments, MU 176 may be located outside of a substation enclosure or control house, thus increasing safety by removing high-energy cables from areas where personnel typically work. In various embodiments, MU 176 may be embodied as an SEL-TMU or SEL-401 available from Schweitzer Engineering Laboratories of Pullman, Wash.

In various embodiments, the streamed data may be transmitted using a non-routable protocol and may not offer interactive remote access. As used herein, a non-routable protocol is any protocol that lacks an addressing scheme for sending data from one network to another. The use of a non-routable protocol and lack of interactive remote access reduces or eliminates the potential for a remote or cyberattack. These features may increase security, reduce complexity, and reduce the associated compliance costs in a distributed remote data acquisition system.

Further, in some embodiments, the streamed data may further be transmitted using a non-switchable protocol. As used herein a non-switchable protocol may refer to a communication protocol that cannot pass through Ethernet switches. Non-switchable protocols may be unable to pass through Ethernet switches because the protocols may lack one or more elements of an Ethernet header (e.g., a destination or source media access control (MAC) address) or may not include other types of information (e.g., a frame check sequence such as a redundancy check information)

System 100 includes a variety of types of monitored equipment (e.g., generators, transformers, breakers, etc.) connected using network 162 and central IED 170. Testing the interaction of various elements within system 100 is part of ensuring the safe and reliable operation of system 100. Such testing may include determining a response to corrupt data transmissions, determining a response to variable time delays in delivery of data, determining a response to network congestion, testing the conversion of data packet types, etc. As discussed below, these test modes and other test operations may be implemented using the systems and methods disclosed herein.

Figure 2:
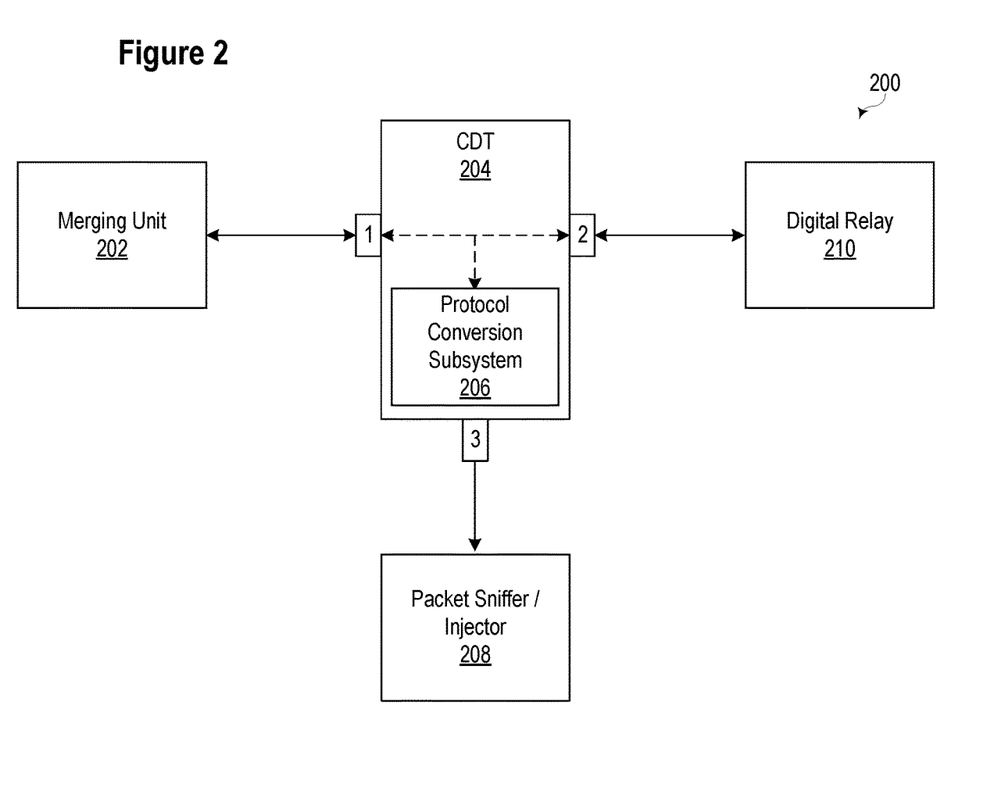
FIG. 2 illustrates a system including a communication device tester (CDT) configured to redirect data traffic between a merging unit and a digital relay to a packet sniffer/injector consistent with embodiments of the present disclosure.

FIG. 2 illustrates a system 200 including a CDT 204 configured to redirect data traffic between a merging unit 202 and a digital relay 210 to a packet sniffer/injector 208 consistent with embodiments of the present disclosure. Data merging unit 202 may receive a stream of measurements from monitored equipment (e.g., voltage measurements from a voltage transformer, current measurements from a current transformer, etc.).

The stream of measurements may be in a non-routable protocol. Accordingly, CDT 204 includes a protocol conversion subsystem 206 that may convert the information transmitted between merging unit 202 and digital relay 210 into another protocol. In various embodiments, the protocol conversion subsystem 206 may convert a non-routable protocol to a routable protocol, such as an Ethernet packet. Further, in some embodiments, a non-switchable protocol may be converted to a switchable protocol. In one specific embodiment, merging unit 202 may utilize the T-Protocol used by Schweitzer Engineering Laboratories of Pullman, Wash., which is a non-routable and non-switchable protocol.

Further protocol conversion subsystem 206 may further be responsible for performing other types of conversions (e.g., converting an IEC 61850-9-2 packet from a Layer 2 packet to a Layer 3 packet so that the packet becomes switchable). In connection with the conversion, protocol conversion subsystem 206 may generate an address for sending the data through switches and/or from one network to another. Further, protocol conversion subsystem 206 may add other information to the converted packet, such as a cyclical redundancy check (CRC). In other embodiments, packets injected by packet sniffer/injector 208 may be converted from a routable protocol to a non-routable protocol used by merging unit 202 and digital relay 210. In alternative embodiments, CDT 204 may generate packets to transmit to digital relay 210 instead of receiving such packets from packet sniffer/injector 208.

Use of the packet sniffer/injector 208 may allow an operator to confirm that digital relay 210 responds to information provided by merging unit 202 as expected. Moreover, the conversion of information transmitted between merging unit 202 and digital relay 210 from a non-switchable to a switchable protocol may retain the advantages discussed above during typical operation while increasing the flexibility of a system under test. For example, the conversion of a non-switchable protocol to a switchable protocol may allow existing programs and tools to analyze the data stream. Still further, the conversion may also operate in reverse (i.e., conversion of a switchable protocol to a non-switchable protocol), which may be used to provide simulated or recorded data to digital relay 210.

CDT 204 may be used in various configurations to test both merging unit 202 and digital relay 210 or to test each component individually. In various embodiments, the packet sniffer/injector 208 may transmit test information to merging unit 202 and/or digital relay 210. Such test information may allow an operator to test both merging unit 202 and digital relay 210 simultaneously, or to test the devices independently. Such tests may include modifying or corrupting data, simulating communication delay, blocking communication, etc. Corruption of data may also allow validation of error detection and/or error correction algorithms.

Still further, use of the packet sniffer/injector 208 may facilitate analysis of the communication channel between digital relay 210 and merging unit 202. Such analysis may include determining transmit and receive speed, latency of the channel, frame content, frame length, physical circuit status health, etc. Upon completion of the test, CDT 204 may be removed and/or disabled, thus allowing merging unit 202 and digital relay 210 to communicate using a non-routable protocol.

Figure 3:
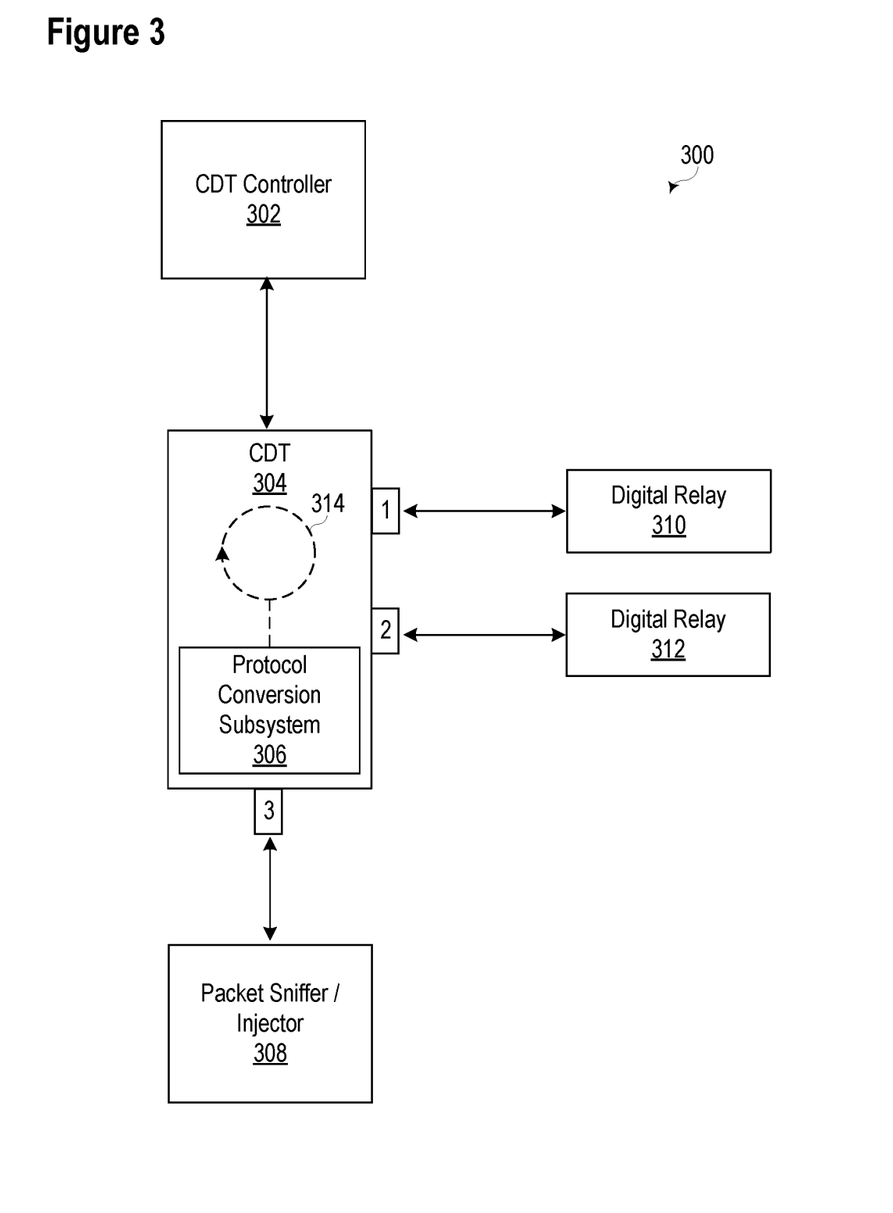
FIG. 3 illustrates a system including a CDT configured to replicate traffic sent to a first digital relay and a second digital relay consistent with embodiments of the present disclosure.

FIG. 3 illustrates a system 300 including a CDT 304 configured to replicate traffic sent to a first digital relay 310 and a second digital relay 312 consistent with embodiments of the present disclosure. A CDT controller 302 may configure CDT 304 to selectively replicate traffic sent to digital relays 310 and 312. The replicated traffic may be provided to packet sniffer/injector 308 without interrupting a communication link between digital relay 310 and 312. Further, the digital relay 310 and digital relay 312 may continue to receive traffic in an expected format, while protocol conversion subsystem 306 may convert information from the replicated into another protocol. Further, CDT 304 may synchronously and deterministically send data to each port (e.g., digital relay 310 and digital relay 312 each receive the same data at the same time). In various embodiments, a connection between CDT controller 302 and CDT 304 may comprise a serial interface. In one configuration, traffic to and from digital relay 310 may also be sent to digital relay 312, while in another configuration, traffic to and from digital relay 312 may be sent to digital relay 310. Still further in another configuration, packets may be sent to and/or received from packet sniffer/injector 308.

A buffer 314 may be used to store, replicate, and/or delay data transmissions in various embodiments. Incoming data transmissions may be stored in buffer 314 and may be delayed, modified, corrupted, and/or rebroadcast by CDT 304. Delaying a signal may allow an operator to simulate propagation delay across a length of the communication channel without requiring a physical cable of the same length as the communication channel. Further, simulation of delay may also be used to test for delays attributable to network congestion and/or other issues.

Figure 4:
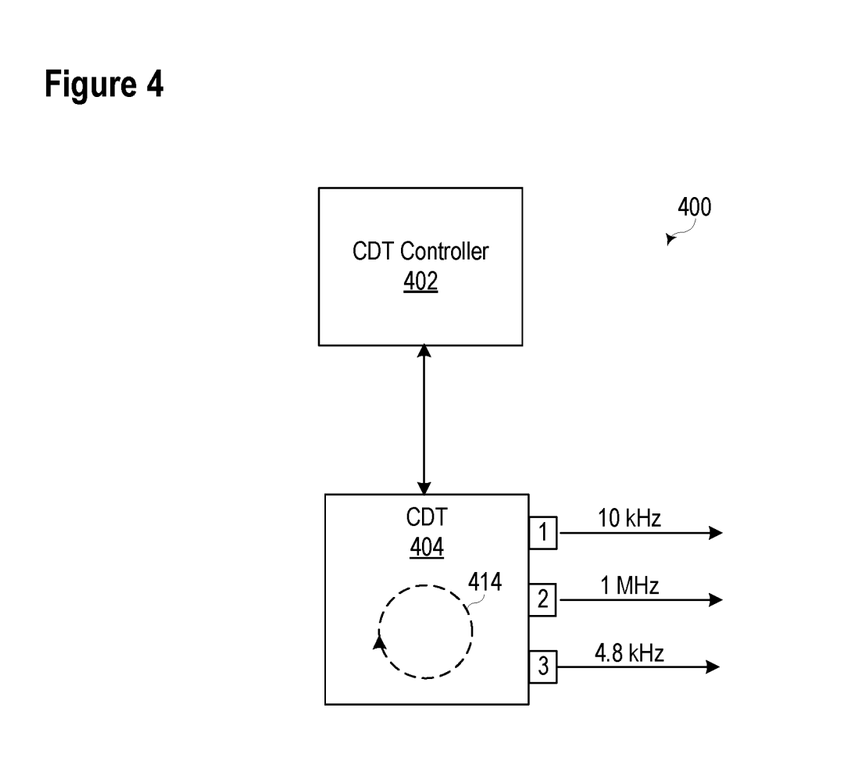
FIG. 4 illustrates a system including a CDT configured to de-jitter and discipline data packets based on a traffic metric consistent with embodiments of the present disclosure.

FIG. 4 illustrates a system 400 including a CDT 404 configured to de-jitter and discipline data packets based on a traffic metric consistent with embodiments of the present disclosure. In the illustrated embodiment, packets from a buffer 414 are transmitted at fixed transmission rates of 10 kHz, 1 MHz, and 4.8 kHz on three output ports. In some embodiments, the transmission rates may be selected to correspond to a transmission rate of a merging unit or another type of data acquisition system. The fixed-rate transmissions may be used as a stimulus for an IED under test. The rate of transmission may be the metric used in various embodiments for disciplining traffic from CDT 404. In various embodiments, the transmission rates may be set by CDT controller 402. The fixed transmission rates may be used to simulate outputs from a data collection device, such as a merging unit. In other embodiments, the metric may be based on utilization of a fixed portion of an available bandwidth of a communication channel. For example, CDT 404 may generate traffic equal to a percentage of the maximum available bandwidth.

Figure 5:
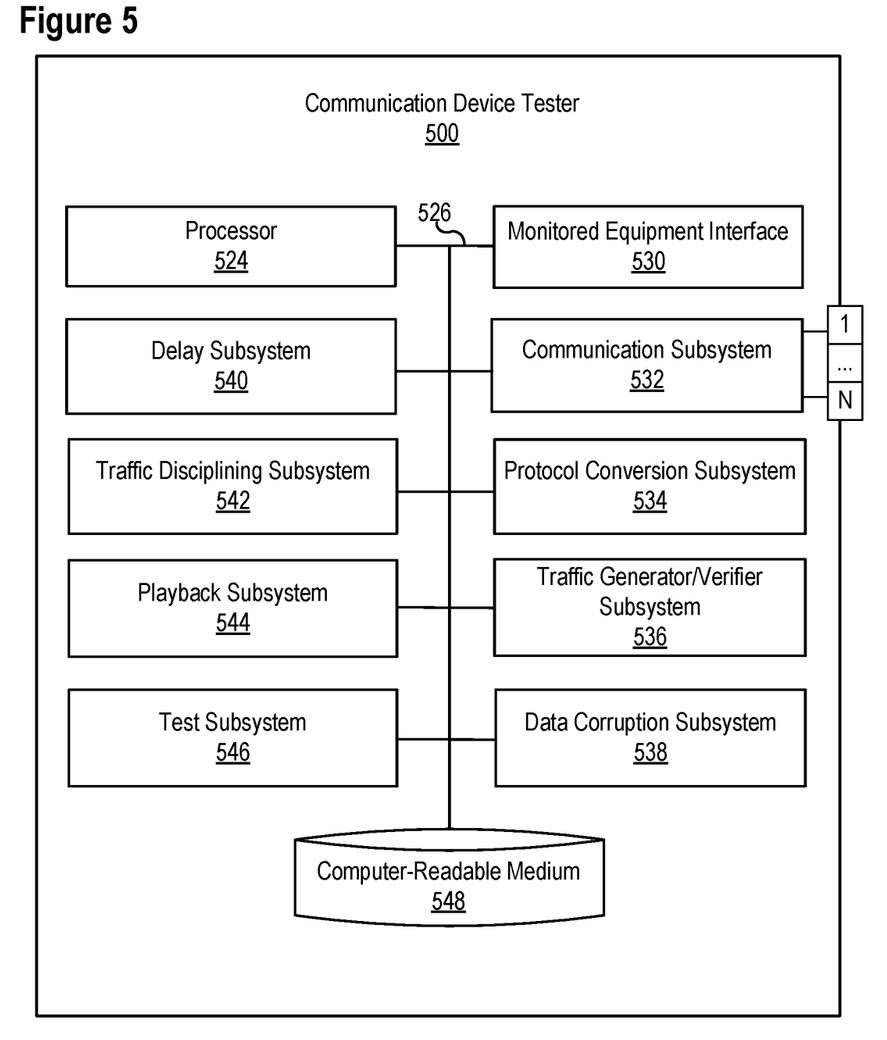
FIG. 5 illustrates a functional block diagram of a CDT system consistent with embodiments of the present disclosure.

FIG. 5 illustrates a functional block diagram of a CDT system 500 consistent with embodiments of the present disclosure. CDT System 500 may be implemented using hardware, software, firmware, and/or any combination thereof. In some embodiments, CDT system 500 may be embodied as an IED, while in other embodiments, certain components or functions described herein may be associated with other devices or performed by other devices. The specifically illustrated configuration is merely representative of one embodiment consistent with the present disclosure.

CDT System 500 includes a communication subsystem 532 to communicate with devices and/or IEDs. Communication subsystem 532 may include multiple ports (e.g., ports 1 through N) that may be used to connect to various devices. Devices under test may be connected to a port of communication subsystem 532. A CDT controller (e.g., CDT controller 302 illustrated in FIG. 3) may also connect to a port of communication subsystem 532. In certain embodiments, communication subsystem 532 may facilitate direct communication with other IEDs or communicate with systems over a communications network. Measurements relating to electrical conditions and other information used by CDT system 500 may be transmitted via communication subsystem 532. Further, measurements and information created by CDT system 500 may be transmitted via communication subsystem 532 to other components.

A monitored equipment interface 530 may receive status information from, and issue control instructions to, a piece of monitored equipment (such as a generator, transformer, circuit breaker, or the like). Monitored equipment interface 530 may implement control actions by issuing commands to monitored equipment.

Processor 524 processes communications received via communication subsystem 532, monitored equipment interface 530, and the other subsystems and components in CDT system 500. Processor 524 may operate using any number of processing rates and architectures. Processor 524 may perform various algorithms and calculations described herein. Processor 524 may be embodied as a general-purpose integrated circuit, an application-specific integrated circuit, a field-programmable gate array, and/or any other suitable programmable logic device. Processor 524 may be in communication with other components of CDT 500 using a bus 526.

Computer-readable medium 548 may comprise any of a variety of non-transitory computer-readable storage media. Computer-readable medium 548 may comprise executable instructions to perform processes described herein. Computer-readable medium 548 may comprise non-transitory machine-readable media such as, but not limited to, hard drives, removable media, optical disks, CD-ROMs, DVD-ROMs, ROMs, RAMs, EPROMs, EEPROMs, magnetic or optical cards, solid-state memory devices, or other types of media/machine-readable media suitable for storing electronic instructions. Such electronic instructions may be executed on processor 524. In certain embodiments, the functionalities associated with various subsystems described herein may be implemented as modules stored on computer-readable medium 548.

A protocol conversion subsystem 534 may convert between various protocols used by devices in communication with CDT 500. For example, protocol conversion subsystem 534 may convert a stream of packets from a non-routable protocol to a routable protocol. Protocol conversion subsystem 534 may add or remove information (e.g., CRC information) from packets as part of a conversion. Such protocols may include routable and non-routable protocols. In one specific embodiment, protocol conversion subsystem 534 may generate an output to provide to a packet sniffer and/or packet injector (e.g., packet sniffer/injector 208 illustrated in FIG. 2).

A traffic generator/verifier subsystem 536 may be used to generate a stream of data transmitted to devices in communication with CDT 500. For example, traffic generator/verifier subsystem 536 may generate a stream of data packets to be transmitted to a digital relay under test. Alternatively, traffic generator/verifier subsystem 536 may generate a stream of data provided to a merging unit under test. Traffic generator/verifier subsystem 536 may also verify traffic received by CDT 500 from a device under test. Traffic generator/verifier subsystem 536 may verify information about the stream of data and/or the physical communication medium (e.g., cable integrity). For example, traffic generator/verifier subsystem 536 may verify statistics about a number of received frames, a number of received frames less than 64 bytes, a number of receive frames equal to 64 bytes, a number of receive frames greater than or equal to 65 bytes and less than 128 bytes, etc. In another example, the generator/verifier subsystem 536 may determine whether a remote device modifies data in any way (e.g., calculating a checksum to determine if the a packet is physically correct but functionally corrupt) by incorporating double CRCs on the packet. Still further, data streams may be forwarded to another device for any type of verification. after conversion to a switchable protocol.

A data corruption subsystem 538 may corrupt data transmitted to a device under test. Data corruption subsystem 538 may selectively corrupt data transmitted to a device under test to assess how the device responds to the corrupted data stream. Data corruption subsystem 538 may allow for testing of data corruption detection and/or data corruption correction systems in devices under test.

A delay subsystem 540 may simulate the delay associated with a communication channel. In various embodiments, delay subsystem 540 may simulate a propagation delay associated with a long span of cable. Such a scenario may be suitable for testing, for example, a communication channel between relays disposed at opposite ends of an electric transmission line. Delay subsystem 540 may also simulate communication delays resulting from network congestion or other issues.

A traffic disciplining subsystem 542 may generate a packet stream at a fixed transmission rate or at a fixed bandwidth allocation. In some embodiments, traffic disciplining subsystem 542 may generate multiple packet streams with the same data or with different data at multiple fixed transmission rates. Traffic disciplining subsystem 542 may be used to provide a stimulus simulating input from a merging device or other data acquisition system. Such a stimulus may be used to test protective relays and other devices that receive such inputs. Still further, traffic disciplining subsystem 542 may generate traffic corresponding to a fixed portion of an available bandwidth.

A playback subsystem 544 may generate a stimulus for a device under test based on an input data stream. In some embodiments, the playback may be immediate or nearly immediate. For example, playback subsystem 544 may replicate traffic destined for one port on multiple ports (e.g., as illustrated by system 300 in FIG. 3). In other embodiments, playback subsystem 544 may utilize data collected at a different time to generate a stimulus. For example, data recorded in a Common format for Transient Data Exchange (COMTRADE) file may be used by playback subsystem 544 to generate a stimulus to provide to a device under test. Other formats may also be used, including but not limited to Packet Capture (PCAP), Packet Capture Next Generation (PCAPNG), and the like.

A test subsystem 546 may operate in conjunction with the other subsystems to implement various types of tests and determine whether a device under test passes such tests. For example, test subsystem 546 may operate in conjunction with data corruption subsystem 538 to determine whether a device under test passes a test in response to a data stream corrupted by data corruption subsystem 538. Similarly, test subsystem 546 may operate in conjunction with delay subsystem 540 to determine whether a device under test passes in response to a data stream delayed by delay subsystem 540. A variety of test parameters may be established for different types of tests. Multiple tests may be performed by the communication device tester 500 and the results may be reported to a user.

Figure 6:
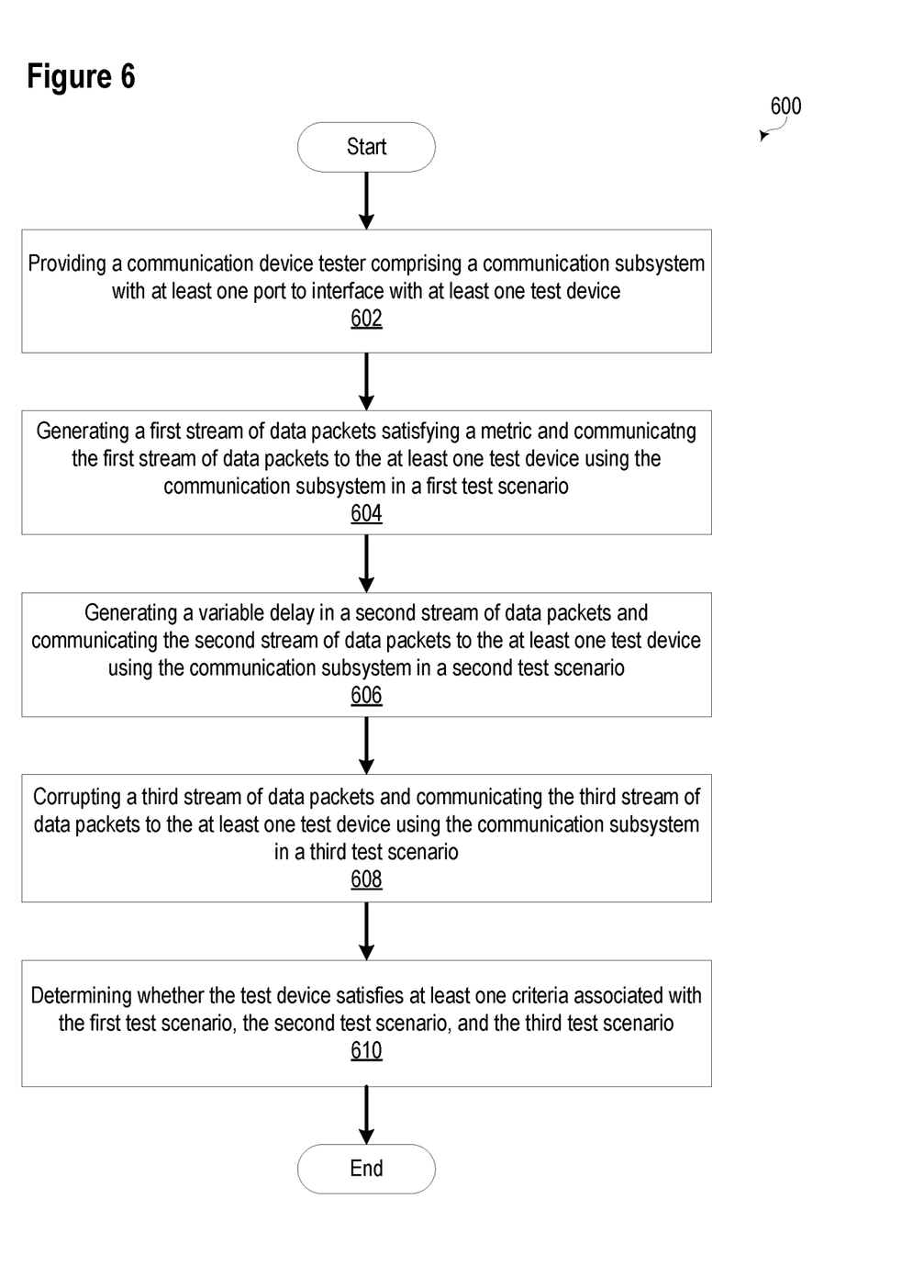
FIG. 6 illustrates a flow chart of a method for testing a communication device using a CDT consistent with embodiments of the present disclosure.

FIG. 6 illustrates a flow chart of a method 600 for testing a communication device consistent with embodiments of the present disclosure. At 602, a communication device tester comprising a communication subsystem with at least one port to interface with at least one test device may be provided. In various embodiments, the communication device tester may operate in either a traditional network or an SDN. In one embodiment, the communication subsystem may be embodied as communication subsystem 532 illustrated in FIG. 5.

At 604, a first stream of data packets may be generated that satisfies a metric and communicates the first stream of data packets to the at least one test device using the communication subsystem in a first test scenario. In various embodiments, the metric may be a fixed data transmission rate. In one specific embodiment, a CDT consistent with the present disclosure may generate one or more streams at a fixed, evenly-spaced frames-per-second rate, such as CDT 404, illustrated in FIG. 4. In another embodiment, the metric may comprise utilization of a fixed portion of an available bandwidth (e.g., a percentage of the maximum allowable link utilization). In still other embodiments, the first stream of data packets may be generated using a traffic disciplining subsystem, such as the traffic disciplining subsystem 542 illustrated in FIG. 5.

At 606, a variable delay in a second stream of data packets may be generated and the second stream of data packets may be communicated to the at least one test device using the communication subsystem in a second test scenario. The variable delay may represent a propagation delay (e.g., a delay associated with propagating along a long physical span of cable) or may represent delay resulting from network congestion or other types of network delays. In one specific embodiment, the second stream of data packets may be delayed using a delay subsystem, such as delay subsystem 540 illustrated in FIG. 5.

At 608, a third stream of data packets may be corrupted and communicated to the at least one test device using the communication subsystem in a third test scenario. The corrupted data may test error detection and/or error correction algorithms used by a system consistent with the present disclosure. In one embodiment, the corrupted data stream may be generated by a data corruption subsystem, such as data corruption subsystem 538 illustrated in FIG. 5.

At 610, method 600 may determine whether the test device satisfies at least one criterion associated with each of the first test scenario, the second test scenario, and the third test scenario. The criterion for each test scenario may ensure that the device under test responds as expected in each test scenario. In the event that the device under test fails to respond as expected or fails to satisfy established criteria, an operator may be alerted of the failure and may implement corrective action. In some scenarios, the cause of the failure may be an incorrect configuration, in which case, the operator may adjust the settings to correct the issue. In other scenarios, the cause of the failure may be a defect in the device under test, in which case, the operator may replace the device under test.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined only by the following claims.

What is claimed is:

1. A communication device tester system, comprising:
 a communication subsystem comprising at least one port to interface with at least one test device configured to operate in a machine-to-machine network in an industrial system;
 a traffic disciplining subsystem to generate a first stream of data packets satisfying a metric and to communicate the first stream of data packets to the at least one test device using the communication subsystem in a first test scenario;
 a delay subsystem to generate a variable delay in a second stream of data packets and to communicate the second stream of data packets to the at least one test device using the communication subsystem in a second test scenario;
 a data corruption subsystem to corrupt a third stream of data packets and to communicate the third stream of data packets to the at least one test device using the communication subsystem in a third test scenario;
 a test subsystem to determine whether the at least one test device satisfies at least one criterion associated with each of the first test scenario, the second test scenario, and the third test scenario; and
 a protocol conversion subsystem to convert a non-routable protocol to a routable protocol.

2. The system of claim 1, wherein the at least one test device comprises a merging unit configured to communicate using the non-routable protocol.

3. The system of claim 1, wherein the metric comprises a fixed data transmission rate.

4. The system of claim 1, wherein the metric comprises utilization of a fixed portion of an available bandwidth.

5. The system of claim 1, wherein the at least one test device comprises a digital relay and at least one of the first stream of data packets, the second stream of data packets, and the third stream of data packets comprises a stimulus representing a merging unit.

6. The system of claim 1, further comprising a traffic generator subsystem to generate at least one of the first stream of data packets, the second stream of data packets, and the third stream of data packets.

7. The system of claim 1, further comprising a playback subsystem to generate at least one of the first stream of data packets, the second stream of data packets, and the third stream of data packets from a data file.

8. The system of claim 1, wherein the variable delay represents a propagation delay associated with a communication channel.

9. The system of claim 1, wherein the variable delay represents network congestion.

10. The system of claim 1, wherein the communication subsystem is configured to operate in connection with a software-defined network.

11. A method of testing a communication device, the method comprising:
 providing a communication device tester comprising a communication subsystem comprising at least one port to interface with at least one test device configured to operate in a machine-to-machine network in an industrial system;
 generating, using a traffic disciplining subsystem of the communication device tester, a first stream of data packets satisfying a metric and communicating the first stream of data packets to the at least one test device using the communication subsystem in a first test scenario;
 generating, using a delay subsystem of the communication device tester, a variable delay in a second stream of data packets and communicating the second stream of data packets to the at least one test device using the communication subsystem in a second test scenario;
 corrupting, using a data corruption subsystem of the communication device tester, a third stream of data packets and communicating the third stream of data packets to the at least one test device using the communication subsystem in a third test scenario;
 determining, using a test subsystem of the communication device tester, whether the at least one test device satisfies at least one criterion associated with the first test scenario, the second test scenario, and the third test scenario; and
 converting, using a protocol conversion subsystem, a non-routable protocol to a routable protocol.

12. The method of claim 11, wherein the at least one test device comprises a merging unit configured to communicate using the non-routable protocol.

13. The method of claim 11, wherein the metric comprises a fixed data transmission rate.

14. The method of claim 11, wherein the metric comprises utilization of a fixed portion of an available bandwidth.

15. The method of claim 11, wherein the at least one test device comprises a digital relay and at least one of the first stream of data packets, the second stream of data packets, and the third stream of data packets comprises a stimulus representing a merging unit.

16. The method of claim 11, further comprising generating, using a traffic generator subsystem, at least one of the first stream of data packets, the second stream of data packets, and the third stream of data packets.

17. The method of claim 11, further comprising generating, using a playback subsystem, at least one of the first stream of data packets, the second stream of data packets, and the third stream of data packets from a data file.

18. The method of claim 11, wherein the variable delay represents a propagation delay associated with a communication channel.

19. The method of claim 11, wherein the variable delay represents network congestion.

20. The method of claim 11, wherein the communication subsystem is configured to operate in connection with a software-defined network.

\* \* \* \* \*